United States Patent [19]

Andriash

[11] Patent Number: 5,679,435
[45] Date of Patent: Oct. 21, 1997

[54] VISION CONTROL PANELS WITH PERFORATIONS AND METHOD OF MAKING

[76] Inventor: Michael D. Andriash, 88 Rockland Road, Cambell River, British Columbia, Canada, V9W 1N3

[21] Appl. No.: 598,680

[22] Filed: Feb. 8, 1996

Related U.S. Application Data

[63] Continuation-in-part of Ser. No. 268,549, Aug. 15, 1994, abandoned, and Ser. No. 262,976, Jun. 21, 1994, Pat. No. 5,550,346.

[51] Int. Cl.⁶ ..................... B32B 3/24
[52] U.S. Cl. ........... 428/137; 428/131; 428/195; 428/201; 428/203; 428/204; 428/918; 428/913; 428/38; 428/212; 428/338; 427/243; 359/839; 359/594; 359/536; 219/121.7; 264/400
[58] Field of Search ............ 428/131, 137, 428/195, 201, 203, 204, 918, 913, 38, 212, 338; 427/243; 359/839, 594, 536; 219/121.7; 264/400

[56] References Cited

U.S. PATENT DOCUMENTS

| | | | |
|---|---|---|---|
| 728,063 | 5/1903 | Wilson | 359/839 |
| 809,698 | 1/1906 | Kelley | 359/839 |
| 1,199,882 | 10/1916 | Frey | 359/839 |
| 3,451,877 | 6/1969 | Herschman | 428/137 |
| 3,758,192 | 9/1973 | Bingham | 350/105 |
| 3,877,786 | 4/1975 | Booras et al. | 264/129 |
| 4,153,412 | 5/1979 | Bailey | 8/2.5 A |
| 4,321,778 | 3/1982 | Whitehead | 52/397 |
| 4,440,590 | 4/1984 | Collins et al. | 156/234 |
| 4,497,515 | 2/1985 | Appelson | 296/141 |
| 4,673,609 | 6/1987 | Hill | 428/187 |
| 4,690,419 | 9/1987 | Hoshal | 280/154.5 R |
| 4,925,705 | 5/1990 | Hill | 427/259 |
| 4,940,622 | 7/1990 | Leavitt, Sr. et al. | 428/137 |
| 4,983,436 | 1/1991 | Bailey et al. | 428/40 |
| 5,550,346 | 8/1996 | Andriash et al. | 219/121.72 |
| B1 4,673,609 | 7/1995 | Hill | 428/187 |

FOREIGN PATENT DOCUMENTS

| | | |
|---|---|---|
| 2032417 | 5/1980 | United Kingdom . |
| 2 118 096 A | 10/1983 | United Kingdom . |

*Primary Examiner*—William Watkins
*Attorney, Agent, or Firm*—Nixon & Vanderhye

[57] ABSTRACT

A retro-reflective vision control panel which includes an opaque sheet material coated with retro-reflective light reflecting particles and a dark opaque color on the reverse side thereof, and an image formed over top the retro-reflective particles using colored light permeable translucent inks or films to form an image thereon. The opaque sheet and image have a plurality of perforations spaced thereover such that when the light level on the image side of said panel is slightly less than, equal to, or greater than that on the other side, an observer on the image side clearly sees the image while an observer on the other side sees through the panel without seeing any trace whatsoever of the image or design.

27 Claims, 6 Drawing Sheets

VISION CONTROL PANELS WITH PERFORATIONS AND METHOD OF MAKING

RELATED APPLICATIONS

The present application is a continuation-in-part of patent application Ser. No. 08/268,549, filed Aug. 15, 1994, and a continuation-in-part of patent application Ser. No. 262,976, filed Jun. 21, 1994, now U.S. Pat. No. 5,550,346, issued Aug. 27, 1996.

BACKGROUND

The present invention relates to a method of forming light permeable panels so that a viewer on one side of the panel can see through the panel whereas a viewer positioned on the other side of the panel cannot easily see through the panel and sees an image and/or message printed on the panel instead.

United Kingdom Patent Application Number 2,032,417 by Whitehead discloses forming a pattern or silhouette of black and white superimposed dots or other shapes on the surfaces of a glass panel by silk-screening a ceramic ink onto glass. Alternatively, the dots may be first formed on a carrier paper and then transferred onto the glass by a decal or transfer method. The glass is then dried and heat treated. The effect is to produce a panel which can be seen through from one side but not the other.

United Kingdom Patent Application Number 2, 118,096 by Hill and Yule discloses a transparent plastic sheet material with a pattern of opaque dots overprinted with patterns of a different color so that one or more colors can be seen from one side and the other from the other side. Various methods of achieving registration of the two different sets of dots are explained and discussed. These techniques involve etching, embossing, selective solvent action on a first layer of a two layer paint, electrostatic or adhesive used over an area of pattern to attract coloring powder, engraving, etc. Each of the latter techniques requires several steps and is relatively complex while at the same time visually limiting dependent on the degree of brightness of light on one side which must be significantly greater than that on the opposite side.

U.S. Pat. No. 4,673,609 issued to Hill on Jun. 16, 1987 discloses a transparent sheet material with a pattern of opaque dots dividing up the sheet into a plurality of opaque areas and a plurality of transparent or translucent areas, which the patentee terms a silhouette design, may be formed on the dots so that it is seen from one side of the panel but not the other, provided, however, that the level of light on the image side is greater than the level of light on the other side. Hill simply substitutes for some of the single colors on one side of the opaque dots, different colors so as to form a design. The Technique required to generate the latter panel are the same as those as discussed above, with respect to the U.K. Hill and Yule patent. To produce different designs of Hill's printed dot technology on a sheet of light permeable material, Hill U.S. does disclose forming a silhouette using holes for the transparent areas rather than colored dots. He states that holes may be formed before or after printing the required design "blocked out" in selected areas. The holes form the transparent areas in a net or filigree type of silhouette pattern. In this case the design is superimposed over the silhouette pattern so that portions of it are transparent because of the holes whereas the remainder between the silhouette patterns would not be transparent. This perforation pattern would tend to block the visibility through the film or sheet of a viewer on the side of the film opposite to the design. The purpose of the holes in Hill U.S. is simply to provide a silhouette pattern to the viewer such as regularly spaced apart lines or a tartan-like pattern. The advantages of forming a vision control panel using perforations instead of printed dots are not described by Hill U.S. Further, the primary purpose of Hill's perforations in this silhouette pattern is to make a silhouette design for use as a stencil in which to print the dots which is the basis of Hill's U.S. invention. Hill U.S. discloses producing differential designs of his printed dot technology on a sheet of light permeable material by developing an image with stencils and masks then spraying multiple callers through cut film with holes for the transparent areas in place of the colored dots used to form an image. A hole however cannot be equivalent to a colored printed opaque dot in that the contrasting colors of the printed dots on the light permeable sheet material comprises the image seen clearly on one side of the panel and not seen on the other side, the other side normally being of one dark color without other contrasting colors. Obviously, a perforation cannot be colored to form an image. Image development substituting perforations for colored dots on a light permeable sheet material would not be possible with Hill's disclosed method unless the image was restricted to a colorless silhouette of perforated areas contrasting against non-perforated areas of the light permeable sheet material. Moreover, in Hills method using dots, the sheet material must be transparent whereas with perforations are applications to an opaque sheet material.

One known technique used to simplify formation of sheet material is to start with an opaque sheet material perforated with a plurality of small holes with a dark color on the reverse side thereof. A silk-screening process can be used to apply opaque colors to form a design applied over the dark color. The holes provide the transparency and the dark color masks the design or light color from a viewer on one side of the sheet who sees only a tinted view. A viewer on the other side sees only the design. A problem with this technique is that often paint enters the holes and blocks the visibility in the perforated regions. Merely relying on Hill's printed dot method or on silk-screening or spraying or painting opaque colors on a opaque sheet material then perforating same, or applying the colors to a pre-perforated sheet material, does not allow the vision control panel to illuminate or become visible in the evenings with minimal light shining on the image side of the vision control panel. Hill's U.S. technique requires the light level on the image side of the panel to be "greater" than the light level on the opposite side or else the image and design will disappear.

Accordingly, it is an object of the invention to provide an improved method of fabricating an improved vision control panel. It is a further object to provide a vision control panel having a plurality of opaque areas with one or more retro-reflective light reflecting translucent colors on one side on a dark opaque color on the opposite side, and separated by perforations. It is yet a further object of the invention to provide such a vision control panel which can encompass a design formed where the translucent retro-reflective light reflecting colors are located. It is yet a further object of the invention to provide a method of forming a perforated sheet material with a plurality of opaque regions with overlaying colored retro-reflective light reflective regions and opaque and colored regions having improved registration properties and improved viewing properties.

SUMMARY OF THE INVENTION

According to the invention there is provided a vision control panel made up of an retro-reflective opaque sheet material with a dark color on the reverse side and an image formed on one surface of the opaque sheet. The opaque sheet and retro-reflective image have a plurality of perforations spaced thereover such that when the light level on the image side of the panel is slightly less than, equal to, or greater than that on the other side, an observer on the image side sees only the image while an observer on the other side sees through the panel without seeing the image. By perforating the entire image or design, one avoids blocking vision through the design from the side opposite the image side. Moreover, in fabricating the panel there is no need to align inks forming the design as would be the case in prior methods using ink dots on a light permeable, transparent, non opaque sheet.

The construction of retro-reflective material which is proprietary to companies like the 3M Company and Avery Dennison under brand names like Scotchlite (trademark) and FASIGN (trademark) cannot be constructed by merely printing inks. They must come in the form of pre-constructed opaque sheet materials using glass beads or metallized particles formed between various substrates of adhesives, colored sheet materials and other laminates. These retro-reflective sheet materials may then be over-printed with translucent light permeable inks which allow light to pass therethrough allowing for light reflection of the colored image and design of 100,200, 300 candle power and more for improved viewing properties under varying light conditions.

Preferably the image is formed by at least two different colors in the form of a design. A transparent sheet containing a U.V. chemical resistor may be used to cover the image on either side of the sheet material to prevent dirt or rain drops from entering the perforations and to protect the pigments of the colors from rapid sun fading. The placement of the transparent sheet on one side as opposed to the other side depends on whether the sheet material is to be attached to the inside or outside of the window or glass. The assembly methods used for attachment of the transparent protective sheet vary depending on visibility requirements. In one method of making a vision control panel, there is no glue or adhesive coating the transparent sheet material therefor there is no possibility for the glue to yellow in the transparent regions of the perforated panel. In another method of making a vision control panel, the transparent protective sheet material has a clear adhesive coating which eliminates the requirement of a transfer adhesive first applied to the retro-reflective sheet material prior to perforation.

In another aspect of the invention there is provided a method of forming a vision control panel which includes forming a combination of pre selected retro-reflective light reflecting films overlaid with translucent ink colors or films and an underlying dark colored opaque light absorbing color or film and then perforating the combination to form a matrix of spaced apart small apertures over the combination of such a density that a viewer of the opaque dark colored side can see through the panel but a viewer on the other side sees only the retro-reflective light reflecting colors and image thereon.

Preferably the diameter of each of the apertures is small enough so that the individual holes are not easily distinguishable by a viewer.

The individual holes may be formed by a plurality of spaced apart dies or preferably by laser perforation which will remove the small plugs from the material without gumming up the dies normally caused by adhesives contained within the assembled sheet material.

Advantageously, the retro-reflective light reflecting film may have a white color overlaid on a dark color. The white side of the retro-reflective film is then coated with light reflecting particles such as glass beads, metallizing or other light reflecting particles held in place by a clear top coating. Additional translucent light permeable colors may then be overlaid over the retro-reflective light reflecting white film.

The translucent light permeable colors may be applied over the retro-reflective sheet material before or after perforating. The sheet material may be vinyl containing retro-reflective particles.

In accordance with this continuation-in-part application, there is provided a retro-reflective vision control panel, comprising sheet material having retro-reflective material on and visible from one side of the sheet material and having an opaque surface on an opposite side thereof, an array of laser formed perforations through the sheet material including through the retro-reflective material, light-permeable material provided on one side of the sheet material defining an image on one side, such that, when the light level on one side of the panel facing the retro-reflective surface thereof is greater or less than or comparable to the level of light on the opposite side, an observer on the retro-reflective side sees the image on the retro-reflective surface while an observer on the opposite side sees through the panel without seeing the image, the light-permeable material comprising a translucent image-forming material, the translucent material overlying the retro-reflective material with the perforations extending through the light-permeable material, the sheet material comprised of a plastic material.

Further in accordance with this continuation-in-part application, there is provided a retro-reflective vision control panel, comprising sheet material having retro-reflective material on and visible from one side of the sheet material and having an opaque surface on an opposite side thereof and an array of perforations through the sheet material and through the retro-reflective material, the perforations forming 10–68% of open area through the sheet material and the retro-reflective material, such that an observer on the retro-reflective side sees the retro-reflective material while an observer on the opposite side sees through the panel without seeing the retro-reflective material.

In a further embodiment in accordance with this continuation-in-part application, there is provided a method of forming a vision control panel, comprising perforating a sheet material having a retro-reflective surface on one side and an opaque surface on the other to form an array of perforations over the surface thereof and applying a light-permeable material in overlying relation to the retro-reflective surface to define an image on one side of the sheet material, whereby an observer on the retro-reflective side of the sheet material sees the image on one side, while an observer on the other side sees through the panel without seeing the image.

BRIEF DESCRIPTION OF THE DRAWINGS

The novel features believed to characterize the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
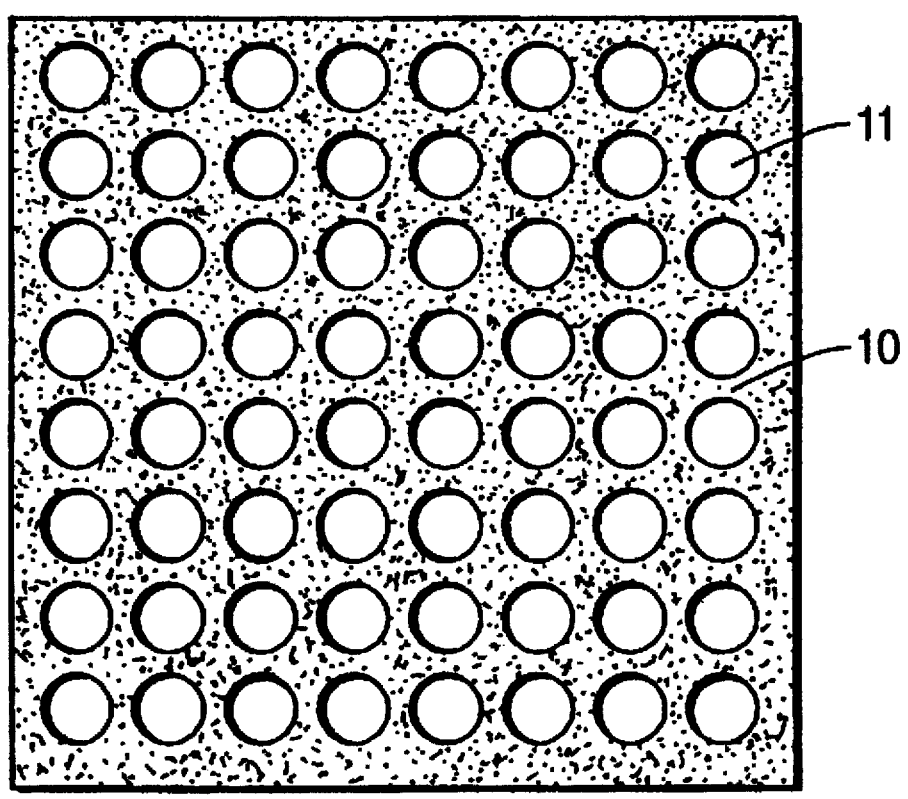
FIG. 1 is a plan view showing the pattern of perforations for the structure of FIG. 2.

In the drawings, like reference numbers refer to like pads. Referring to FIG. 1 there is shown a section of opaque retro-reflective vinyl sheet 10 typically 2–8 millimeters thick and designed for application to window glass by adhesion or electrostatic attraction. Such special vinyl is commercially available from a number of sources. The diameter of each hole 11 may vary depending on the required density to match the viewing distance. A density of 64 holes per inch on a rectangular grid array is shown in FIG. 1 (not to scale). The holes may be made with convention dies in a rectangular grid array but laser perforation is preferred because the retro-reflective sheet materials are difficult to cut and because the glass beads causes excess tool wear or rapid dulling of the dies. Laser perforation and removal of the cut plugs does not cause the dies to be clogged or gummed up with the adhesive coatings within the vision control panel as in convention die perforation.

More specifically, with respect to hole size, shape and areas, the holes may be formed other than circular, such as square or triangular. Preferably, the holes are circular and, for vision control panels, have a hole diameter within a range of 0.03 inches to 0.25 inches (0.78 mm to 6.36 mm). With those ranges, 10–68% of the panel comprises open areas defined by the holes. A typical vision control panel may therefore have a hole diameter of 0.05 inches (1.28 mm) with 114 holes per square inch providing an open area of 22%.

Figure 2:
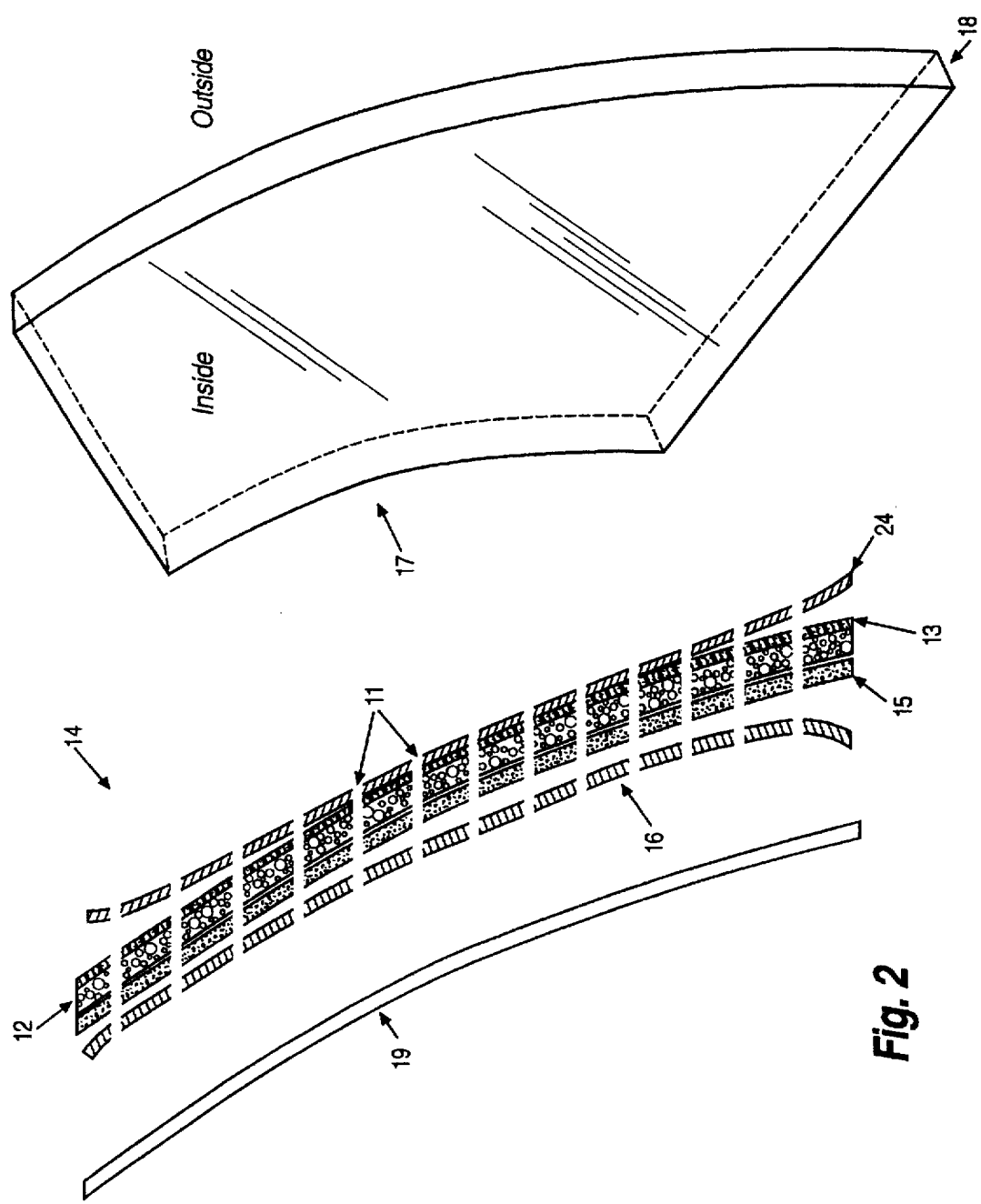
FIG. 2 is an elevated view of the structure of a retro-reflective sheet material containing glass beads, metallizing or other retro-reflective particles printed with light permeable translucent inks to allow reflected light to pass through the inks and the clear laminate containing no adhesive coating.

Referring to FIG. 2, there is shown a vision control panel 14 consisting of a retro-reflective sheet material 12 containing glass beads, metallizing or other retro-reflective particles printed to form an image with light permeable translucent inks to allow reflected light to pass through the inks. The printing may be with electrostatic transfer method, silk screening, ink jet printing, painting, or other convention methods of image development. A double sided clear transfer adhesive 13 is placed over the image surface of the sheet material after image printing but before perforation. A removable backer sheet 24 is attached to the transfer adhesive which may be removed just prior to application to the inside of window glass. On the opposite side of the sheet material 12 there is a dark colored adhesive 15 with a removable backer sheet 16 attached to the adhesive 15. The composite structure with image is then perforated with a laser in a manner in which the laser beam cuts out a circular pattern around the peripheral of the plug (or any other closed curvilinear peripheral shape desired), and the plugs removed. The removable backer sheet 16 is removed and a clear laminate with U.V. chemical inhibitors, but without any adhesive coating, 19, is then laminated to the dark colored adhesive 15 to seal the structure from dirt and permit it to be cleaned without getting cleaning solutions like Windex (trademark) or other agents in the holes thereby impairing visibility through the panel. The panel is then ready for installation against the inside of a window or like surface. Removable backer sheet 24 is removed and the panel pressed against the inside surface 17 of a window 18.

Figure 3:
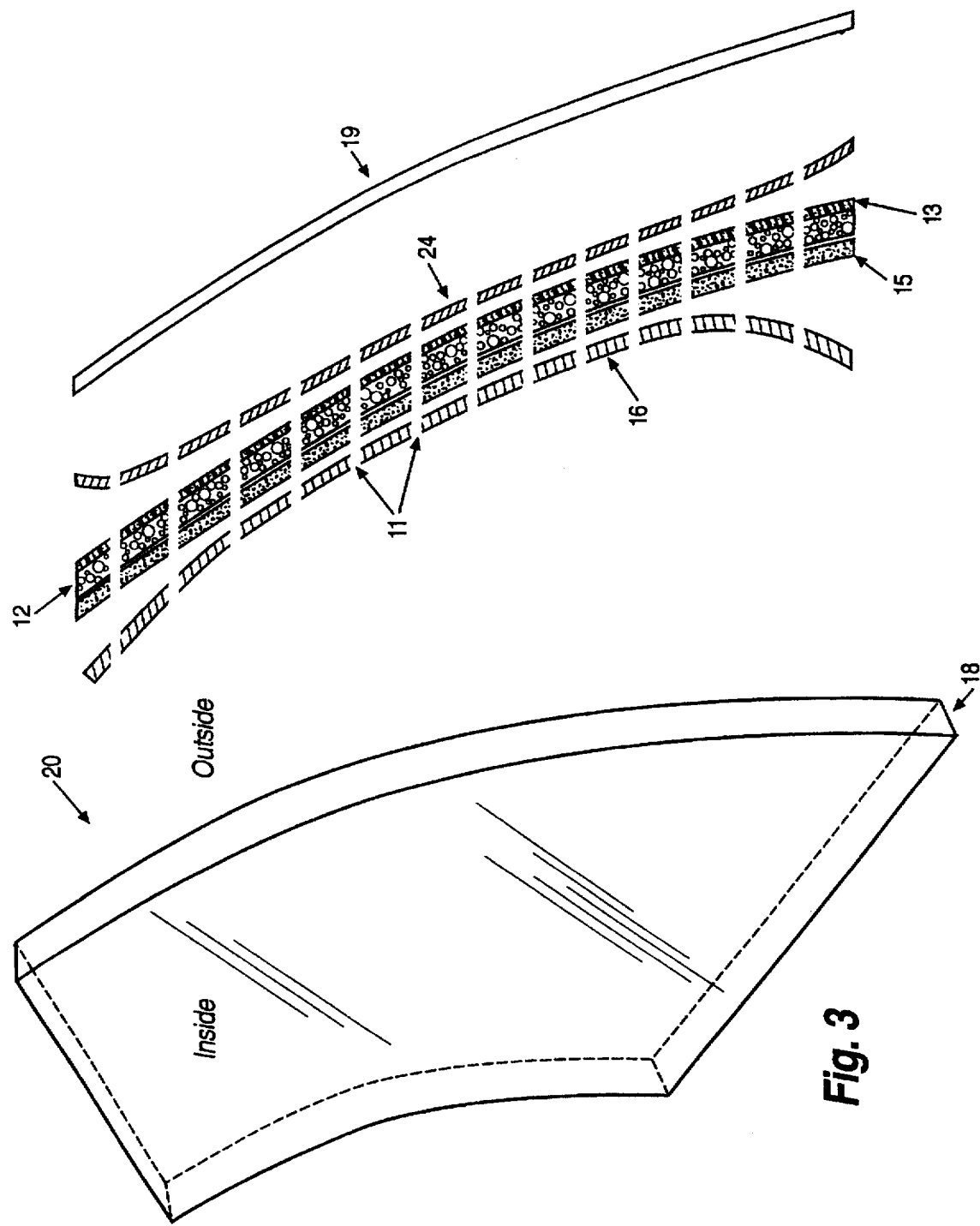
FIG. 3 is an elevation view of the structure of a retro-reflective sheet material as in FIG. 2 except that the clear laminate is on the other side.

Referring to FIG. 3, there is shown a retro-reflective sheet structure 12 designed to attach to the outside surface 20 of a window 18. In this case the only difference from that of FIG. 2 is that the clear laminate 19 is placed against the transfer adhesive 13 and the dark colored adhesive 15 is pressed against the glass normally on the outside surface 20 of window 18.

Figure 4:
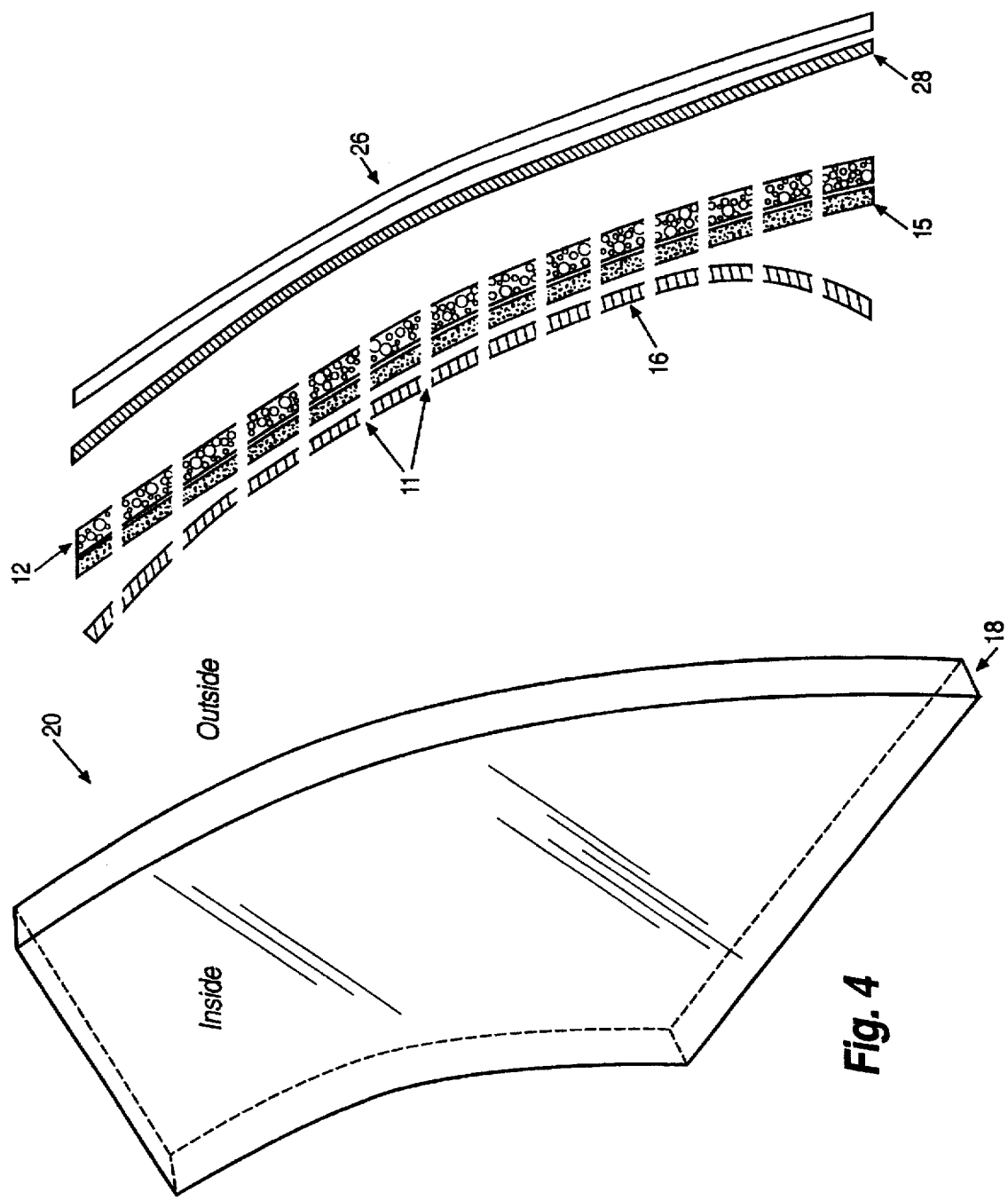
FIG. 4 is an elevation view of the structure of a retro-reflective sheet material as in FIG. 3 except that the clear laminate does contain a clear adhesive coating thereon.

FIG. 4 shows a retro-reflective sheet material 12 containing glass beads, metallizing or other retro-reflective particles printed to form an image with light permeable translucent inks to allow reflected light to pass through the inks as in FIG. 2 and 3 except that no transfer adhesive 13 is used. A clear laminate with clear adhesive coating 26 has a removable backer sheet 28 attached to the adhesive coating on clear laminate 26. The removable backer sheet 28 is removed from the clear laminate with clear adhesive coating 26 and pressed or laminated to the perforated image surface of sheet material 12. The clear adhesive avoids the glue from affecting vision through the perforations but may yellow over extended periods of time, unlike the clear laminate without adhesive 19 as shown in FIGS. 2 and 3. Translucent light permeable inks may be used to form the image prior to or after perforation but before applying the clear laminate 26.

Figure 5:
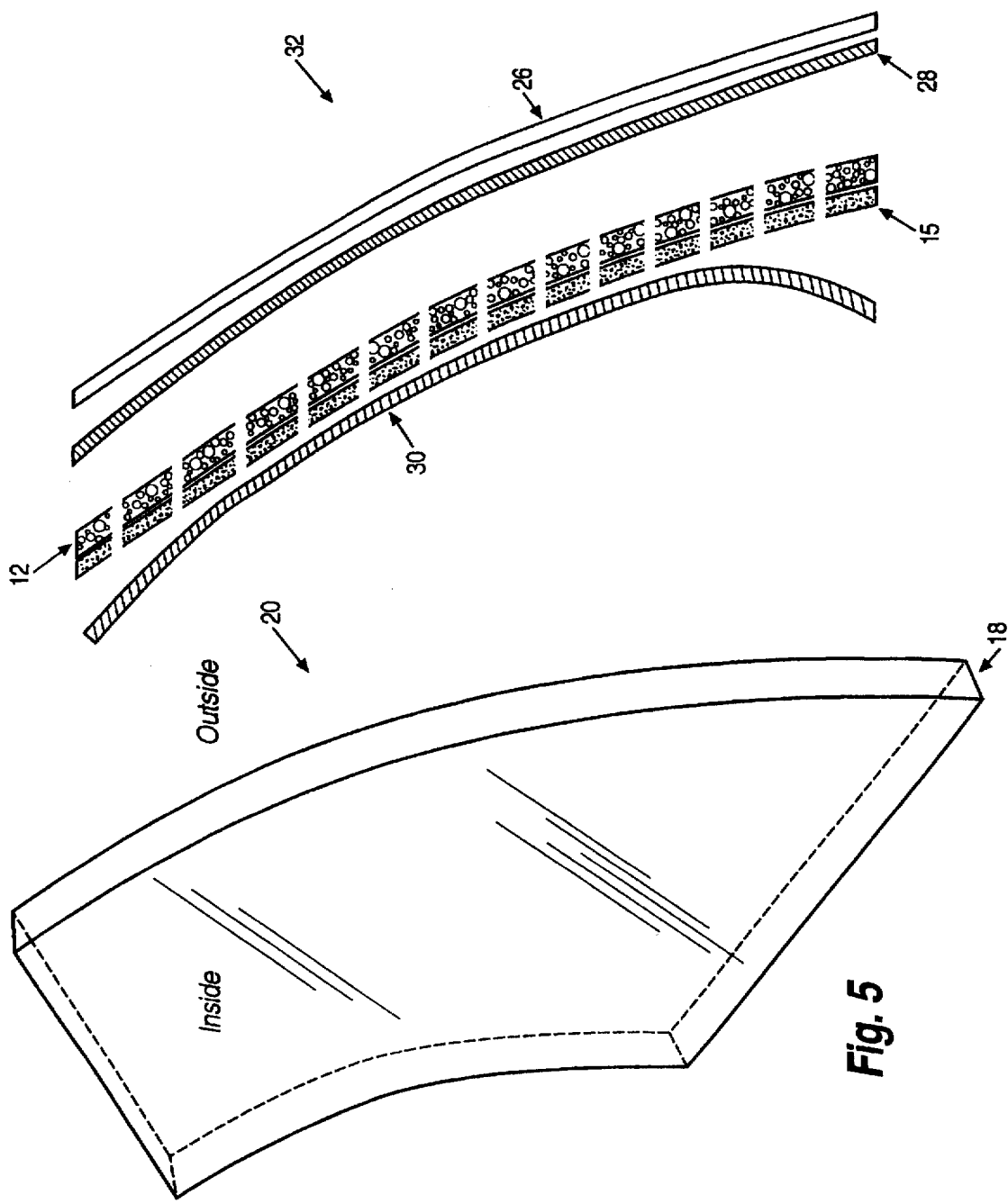
FIG. 5 is an elevation view of the structure of a retro-reflective sheet material as in FIG. 4 except that the retro-reflective sheet material is first pre-perforated prior to printing with light permeable translucent inks.
Figure 6:
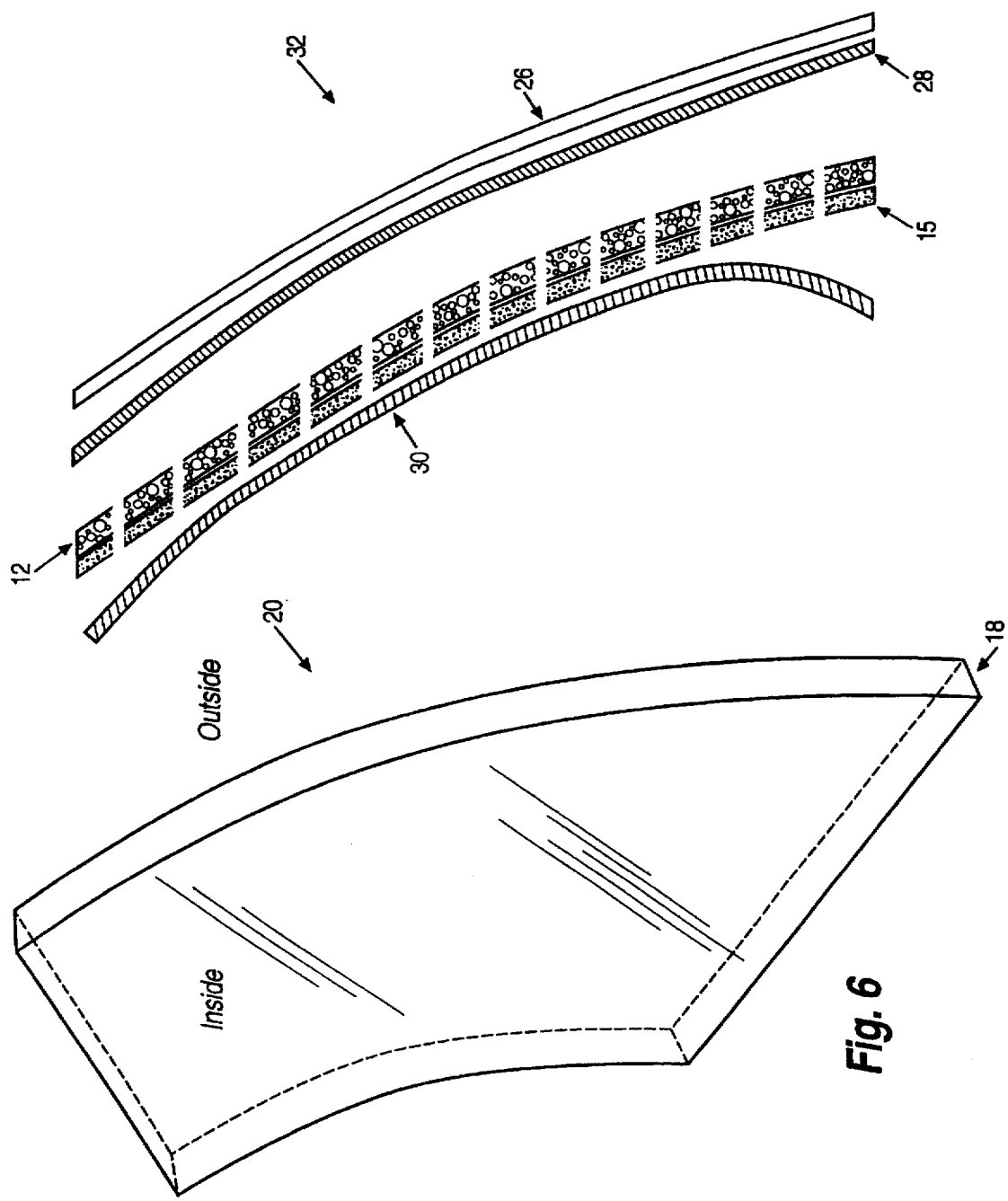
FIG. 6 is an elevation view of the structure of a retro-reflective sheet material as in FIG. 5 except that a non-perforated removable backer sheet is used to carry away excess inks that may be overlaid in the perforated regions during the printing process.

Referring to FIG. 5, there is shown a structure identical to that of FIG. 4 except that a non-perforated removable backer sheet 30 is attached to the dark colored adhesive side 15 of a pre-perforated sheet material 12. The image is formed against the outside surface 32 of sheet material 12 after perforation of the latter. Any ink that gets into the perforations sticks to the removable non-perforated backer sheet 30 and is removed when the latter is removed.

The use of retro-reflective sheet material made with glass beads or other light reflecting particles overlaid with light permeable translucent inks or films provides reflectivities of up to 100 times and more of conventional reflective surfaces. This means that in twilight or even darkness, any significant amount of light will allow a viewer to see the image on the panel, unlike conventional vision control panels which use colored dots.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefor contemplated that the appended claims will cover any such modification or embodiments as fall within the true scope of the invention.

I claim:

1. A retro-reflective vision control panel, comprising:
   sheet material having retro-reflective material on and visible from one side of said sheet material and having an opaque surface on an opposite side thereof;

an array of laser formed perforations through the sheet material including through the retro-reflective material;

light-permeable material provided on said one side of said sheet material defining an image on said one side, such that, when the light level on said one side of the panel facing the retro-reflective material thereof is greater or less than or comparable to the level of light on said opposite side, an observer on said retro-reflective side sees the image on the retro-reflective material side of said sheet material while an observer on said opposite side sees through said panel without seeing the image, said light-permeable material comprising a translucent image-forming material, said translucent material overlying said retro-reflective material with the perforations extending through said light-permeable material, said sheet material comprised of a plastic material.

2. A vision control panel according to claim 1 wherein said perforations are regularly spaced.

3. A vision control panel according to claim 1 including a non-perforated clear laminate sheet secured to and overlying the retro-reflective material of said retro-reflective sheet.

4. A vision control panel according to claim 1 wherein said opaque surface is formed by a dark-colored adhesive, a non-perforated clear laminate sheet secured to and overlying said dark-colored adhesive.

5. A vision control panel according to claim 1 wherein the diameter of said perforations is sufficiently small so that the perforations are indistinguishable by a viewer looking through said panel from at least several feet away.

6. A vision control panel according to claim 1 wherein the fraction of open area occupied by perforations as compared with the total area over which the perforations are formed is in the range of 10–68%.

7. A vision control panel according to claim 1 wherein the light-permeable material comprises a plurality of translucent inks forming said image, said translucent inks being applied to and overlying said retro-reflective material with the perforations extending through said inks, said sheet material comprised of a vinyl.

8. A vision control panel according to claim 1 wherein said perforations are regularly spaced, the diameter of said perforations being sufficiently small so that the perforations are indistinguishable by a viewer looking through said panel from at least several feet away, the fraction of open area being occupied by perforations as compared with the total area over which the perforations are formed is in the range of 10–68%, and wherein the light-permeable material comprises a plurality of translucent inks forming said image, said translucent inks being applied on said retro-reflective material with the perforations extending through said inks.

9. A retro-reflective vision control panel, comprising:

sheet material having retro-reflective material on and visible from one side of said sheet material and having an opaque surface on an opposite side thereof; and an array of laser-formed through the sheet material and through the retro-reflective material, said perforations forming 10–68% of open area through said sheet material and said retro-reflective material, such that an observer on said retro-reflective side sees the retro-reflective material while an observer on said opposite side sees through said panel without seeing the retro-reflective material.

10. A vision control panel according to claim 9 wherein said perforations are circular and have a hole diameter of approximately 0.05 inches.

11. A vision control panel according to claim 9 including light-permeable material comprising a translucent image-forming material overlying said retro-reflective material with the perforations extending through said translucent material and defining an image on said one side, such that an observer on said retro-reflective side sees the image formed by the translucent material while an observer on the opposite side sees through the panel without seeing the image on the retro-reflective material.

12. A method of forming a vision control panel, comprising:

laser perforating a sheet material having a retro-reflective surface on one side and an opaque surface on the other to form an array of perforations over the surface thereof; and applying a light-permeable material in overlying relation to said retro-reflective surface to define an image on said one side of said sheet material, whereby an observer on said retro-reflective side of said sheet material sees the image on said one side, while an observer on the other side sees through said panel without seeing the image.

13. A method of forming a vision control panel according to claim 12 including applying the sheet material to a window.

14. A method according to claim 12 wherein the step of applying light-permeable material includes applying translucent inks in at least one color thereof.

15. A method according to claim 12 wherein the step of applying a light-permeable material includes applying a translucent ink in at least two colors thereof.

16. A method according to claim 12 including applying a clear, double-sided transfer adhesive over said retro-reflective surface.

17. A method according to claim 12 including forming a layer of dark-colored adhesive over the surface opposite said retro-reflective surface.

18. A method according to claim 17 including applying a clear laminate over said dark-colored adhesive.

19. A method according to claim 12 including forming said perforations of a diameter sufficiently small so that the perforations are indistinguishable by a viewer looking through said panel from at least several feet away.

20. A method according to claim 12 including perforating the sheet material so that the fraction of open area occupied by the perforations as compared with the total area over which the perforations are formed is in the range of 10–50%.

21. A retroreflective vision control panel, comprising:

sheet material having retroreflective material on one side thereof and having an opaque surface on an opposite side thereof;

an array of laser-formed perforations through the sheet material and through the retroreflective material, said perforations forming 10–68% of open area through said sheet material and said retroreflective material; and light-permeable material provided on said one side of said sheet material defining an image on said one side such that an observer on said one side of said sheet material sees the image on the retroreflective material side of said sheet material, while an observer on the opposite side of the panel sees through the panel without seeing the image.

22. A vision control panel according to claim 21 wherein said perorations are regularly spaced.

23. A vision control panel according to claim 21 including a non-perforated clear laminate sheet secured to and overlying the retroreflective material of said retroreflective sheet.

24. A vision control panel according to claim 21 wherein said opaque surface is formed of a dark-colored adhesive.

and a non-perforated clear laminate sheet secured to and overlying said dark-colored adhesive.

25. A vision control panel according to claim 21 wherein the diameter of said perforations is sufficiently small so that the perforations are indistinguishable by a viewer looking through said panel from at least several feet away.

26. A vision control panel according to claim 21 wherein the light-permeable material comprises a plurality of translucent inks forming such image, said translucent inks being applied to and overlying said retroreflective material with the perforations extending through said inks.

27. A vision control panel according to claim 21 wherein said perforations are regularly spaced, the diameter of said perforations being sufficiently small so that the perforations are indistinguishable by a viewer looking through said panel from at least several feet away, said light-permeable material comprising a plurality of translucent inks forming said image, said translucent inks being applied on said retroreflective material with the perforations extending through said inks.

* * * * *